US012102081B1

(12) United States Patent
Shaik et al.

(10) Patent No.: US 12,102,081 B1
(45) **Date of Patent: *Oct. 1, 2024**

(54) VERTICAL FARMING SPRAYING SYSTEM

(71) Applicant: Prince Mohammad Bin Fahd University, Dhahran (SA)

(72) Inventors: Feroz Shaik, Dhahran (SA); Faramarz Djavanroodi, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,321

(22) Filed: Mar. 22, 2024

(51) Int. Cl.
*A01M 7/00* (2006.01)

(52) U.S. Cl.
CPC ........ *A01M 7/0042* (2013.01); *A01M 7/0089* (2013.01)

(58) Field of Classification Search
CPC ...... A01M 7/00; A01M 7/005; A01M 7/0042; A01M 7/0089; A01G 25/09; A01G 3/037
See application file for complete search history.

(56) References Cited

U.S. PATENT DOCUMENTS 6,243,987 B1 * 6/2001 Hessel .................. A01G 31/00 47/65.5
8,276,746 B2 * 10/2012 Klotzki ................ B65G 11/063 198/778
10,698,402 B2 * 6/2020 Kosa .................... G05D 1/0022
2006/0213167 A1 * 9/2006 Koselka ................ A01D 75/00 56/10.2 A

FOREIGN PATENT DOCUMENTS

CN 107897157 A 4/2018
CN 106718158 B 12/2019
CN 219741449 U 9/2023

OTHER PUBLICATIONS

Chand et al. ; Design and Analysis of Photovoltaic Powered Battery-Operated Computer Vision-Based Multi-Purpose Smart Farming Robot ; MDPI agronomy 11 ; Mar. 11, 2021 ; 18 Pages.
Abraham et al. ; Hybrid Intelligent Systems ; Advances in Intelligent Systems and Computing 1375 ; 20$^{th}$ International Conference on Hybrid Intelligent Systems (HIS 2020), Dec. 14-16, 2020 ; 833 Pages.

* cited by examiner

*Primary Examiner* — Tuongminh N Pham
(74) *Attorney, Agent, or Firm* — Oblon, McClelland, Maier & Neustadt, L.L.P.

(57) ABSTRACT

A vertical farming spraying system including a robotic mobile sprayer with a base and driving members. The robotic mobile sprayer includes a first cylindrical element connected to a first pump and a second cylindrical element connected to a second pump. A first mechanical support is mounted on the base, supporting a humidity sensor and a humidifier sprayer connected to the first pump; and a second mechanical support is mounted on the base, supporting a disinfection sensor and a disinfection sprayer connected to the second pump. A control unit controls operation of the driving members and mechanical supports, and of the pumps through the respective sensors via a flow control sensor. The vertical farming spraying system further includes a vertically oriented elongated cylindrical support encircled by a spiral path, designed to guide the robotic mobile sprayer from the base to the top for humidification and disinfection operations.

20 Claims, 10 Drawing Sheets

150

100

110

VERTICAL FARMING SPRAYING SYSTEM

BACKGROUND

Technical Field

The present invention relates to the field of agricultural practice and engineering, more specifically to a vertical farming spraying system and method for automated and controlled humidification and disinfection within a vertical farming environment.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vertical farming has emerged as a transformative farming approach, particularly valued in regions where water is scarce, such as arid and semi-arid areas. This method of farming capitalizes on the vertical stacking of growing platforms, enabling the cultivation of plants in controlled environments, typically within buildings or enclosed structures. Vertical farming allows to produce high yields in limited spaces, making it an increasingly popular choice for modern agricultural practices. However, the success of vertical farming relies on the control of environmental factors, with humidity levels being an important factor. The regulation of humidity is required for optimizing plant growth but also for preventing the proliferation of pathogens that could compromise plant health.

Despite the potential benefits of vertical farming, the management of environmental conditions within these systems presents significant challenges. One of the primary issues is the difficulty in maintaining optimal humidity levels across the various levels of the vertical farming structure. Uniform humidification is crucial for ensuring the health and productivity of plants, yet achieving this can be complex due to the layered nature of vertical farms. Additionally, the closed environments typical of vertical farming systems can foster the growth of mold and other pathogens if humidity is not properly controlled. This necessitates regular disinfection to maintain a healthy growing environment, adding another layer of complexity to the management of vertical farms.

Conventional solutions to these challenges have relied heavily on the use of air conditioning systems to regulate temperature and humidity, coupled with manual spraying methods for the application of disinfectants. Air conditioning systems, while effective in controlling climate conditions, are energy-intensive and contribute significantly to the operational costs of vertical farming. Manual spraying, on the other hand, demands labor which increases cost, and may also lead to inconsistent coverage, especially in densely populated or hard-to-reach areas within the vertical farming structure. These methods, while functional, fall short of providing a truly efficient or sustainable approach to environmental control in vertical farming systems.

CN107897157A describes a crawler-type farm chemical spraying vehicle, comprising a crawler-type moving car body, a frame, a water tank, a water pipe, a water pump, a water outlet pipe and a spraying unit; the vehicle frame is a longitudinal section is transverse H-shaped upper and lower double-layer structure, the vehicle frame horizontally installed on the crawler-type moving car on the chassis; the upper layer platform of the vehicle frame is equipped with several said spraying unit, lower layer platform of the frame. is equipped with several the water tank; the structure of this invention is simple, the nozzle vertically upward, and the high speed rotation of the thrashing plate so that the sprayed liquid medicine is gyrate symmetrically and transversely, which effectively makes up the shortcoming of unmanned machine spraying can only spray downwards. However, this reference does not teach about a vertical farming spraying system including a robotic mobile sprayer having a control unit for controlling moisture output using a humidifier sprayer and a disinfectant output using a disinfection sprayer, and a vertically oriented elongated cylindrical support surrounded by a spiral path to provide a guided route for the robotic mobile sprayer.

CN106718158B describes a garden management robot, comprising a platform, four walking mechanism, two first mechanical arm, a first camera, a second mechanical arm, a second camera, a water tank, a medicine box, wherein: the platform is provided with a water tank and a medicine box, two first mechanical arms are respectively installed on one side of the water tank and a medicine outlet; the first camera and the second camera are respectively installed at the front platform and back position of the two ends; the two second mechanical arm is installed on the platform opposite to the first mechanical arm on the other side. However, this reference does not teach about a vertical farming spraying system including a robotic mobile sprayer having a control unit for controlling moisture output using a humidifier sprayer and a disinfectant output using a disinfection sprayer, and a vertically oriented elongated cylindrical support surrounded by a spiral path to provide a guided route for the robotic mobile sprayer.

Non-patent reference titled "Design and Analysis of Photovoltaic Powered Battery-Operated Computer Vision-Based Multi-Purpose Smart Farming Robot" (2021) describes a multi-purpose smart farming robot (MpSFR) that handles both water sprinkling and pesticide spraying. The MpSFR is a photovoltaic (PV) powered battery-operated internet of things (IoT) and computer vision (CV) based robot that helps in automating the watering and spraying process. Firstly, the PV-powered battery-operated autonomous MpSFR equipped with a storage tank for water and pesticide drove with a programmed pumping device is engineered. The sprinkling and spraying mechanisms are made fully automatic with a programmed pattern that utilizes IoT sensors and CV to continuously monitor the soil moisture and the plant's health based on pests. Two servo motors accomplish the horizontal and vertical orientation of the spraying nozzle. However, this reference does not teach about a vertical farming spraying system including a robotic mobile sprayer having a control unit for controlling moisture output using a humidifier sprayer and a disinfectant output using a disinfection sprayer, and a vertically oriented elongated cylindrical support surrounded by a spiral path to provide a guided route for the robotic mobile sprayer.

Non-patent reference titled "Design and Development of Intelligent Pesticide Spraying System for Agricultural Robot" (2021) describes a smart pesticide spraying robotic system consisting of a serial manipulator mounted on a tracked vehicle, vision-based disease detection system and spraying system. The main focus of this reference is towards the development of the hydraulic circuit and control system for dealing with multiple diseases present in the plants by making the decisions for regulating the flow of pesticide and switching among the pesticides to identify the most appropriate one. However, this reference does not teach about a vertical farming spraying system including a robotic mobile sprayer having a control unit for controlling moisture output using a humidifier sprayer and a disinfectant output using a disinfection sprayer, and a vertically oriented elongated cylindrical support surrounded by a spiral path to provide a guided route for the robotic mobile sprayer.

Each of the aforementioned references suffers from one or more drawbacks hindering their adoption. Accordingly, it is one object of the present disclosure to provide a solution which is automated and provides precise control for maintaining optimal environmental conditions, reducing reliance on labor-intensive practices and improving the overall sustainability and productivity of vertical farming operations.

SUMMARY

In an aspect, a vertical farming spraying system is described. The vertical farming spraying system comprises a robotic mobile sprayer. The robotic mobile sprayer comprises a base having a rectangular body coupled with a pair of driving members. Each driving member of the pair of driving members comprises at least two wheels and a track mounted on the at least two wheels. The at least two wheels are configured to drive the track around the at least two wheels. The robotic mobile sprayer further comprises a first cylindrical element and a second cylindrical element attached to a top portion of the base. The robotic mobile sprayer further comprises a pair of pumps at least partially disposed in the base. A first pump of the pair of pumps is connected to the first cylindrical element and a second pump of the pair of pumps is connected to the second cylindrical element. The robotic mobile sprayer further comprises a first mechanical support mounted on a first flat plate. The first flat plate is coupled proximal to a first end of the top portion of the base. The robotic mobile sprayer further comprises a humidity sensor and a humidifier sprayer mounted on the first mechanical support. The humidifier sprayer is fluidly connected to the first pump through a first conduit. The robotic mobile sprayer further comprises a second mechanical support mounted on a second flat plate. The second flat plate is coupled proximal to a second end of the top portion of the base. The robotic mobile sprayer further comprises a disinfection sensor and a disinfection sprayer mounted on the second mechanical support. The disinfection sprayer is fluidly connected to the second pump through a second conduit. A first set of micro-jets is mounted on the humidifier sprayer. A second set of micro-jets is mounted on the disinfection sprayer. The robotic mobile sprayer further comprises a control unit coupled to the base and in electrical communication with each driving member, the first mechanical support, and the second mechanical support. The control unit is configured with instructions to drive the pair of driving members. The control unit is in electrical communication with a flow control sensor connected to the first pump, the second pump, the humidity sensor, and the disinfection sensor. The vertical farming spraying system further comprises a vertically oriented elongated cylindrical support surrounded by a spiral path. The spiral path is configured to constrict locomotion of the robotic mobile sprayer from a start point on the spiral path at a base of the vertically oriented elongated cylindrical support up to an end point on the spiral path at a top of the vertically oriented elongated cylindrical support.

In some embodiments, the vertically oriented elongated cylindrical support comprises a plurality of projections extending from an outer surface of the vertically oriented elongated cylindrical support.

In some embodiments, the spiral path comprises an inner edge in contact with the projections of the vertically oriented elongated cylindrical support.

In some embodiments, a width of the spiral path is at least 1.2 times a width of the base of the robotic mobile sprayer.

In some embodiments, the flow control sensor is configured to receive a first set of inputs from the humidity sensor and control a pumping action of the first pump based on the first set of inputs.

In some embodiments, the pumping action of the first pump controls a moisture output of the humidifier sprayer based on the first set of inputs from the humidity sensor.

In some embodiments, the flow control sensor is configured to receive a second set of inputs from the disinfection sensor and control a pumping action of the second pump based on the second set of inputs.

In some embodiments, the pumping action of the second pump controls a disinfectant output of the disinfection sprayer based on the second set of inputs from the disinfection sensor.

In some embodiments, the humidifier sprayer and the disinfection sprayer are configured to move in a three-dimensional manner.

In some embodiments, the control unit is configured to control a rotation of each of the first mechanical support and the second mechanical support.

In some embodiments, the first mechanical support is configured to rotate about the first flat plate.

In some embodiments, the second mechanical support is configured to rotate about the second flat plate.

In some embodiments, each track is formed of an elastomeric material.

In some embodiments, each track has an outer surface configured to engage with a top surface of the spiral path.

In some embodiments, each track comprises an inner surface in contact with an outer surface of each of the at least two wheels.

In some embodiments, at least one wheel of the at least two wheels is a drive wheel.

In some embodiments, the control unit is configured to drive the track around the at least two wheels and move the base along the spiral path.

In some embodiments, the pair of pumps are peristaltic pumps.

In some embodiments, each of the first mechanical support and the second mechanical support comprises a set of bars and a set of joints.

In some embodiments, the set of joints are connection points between the set of bars.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
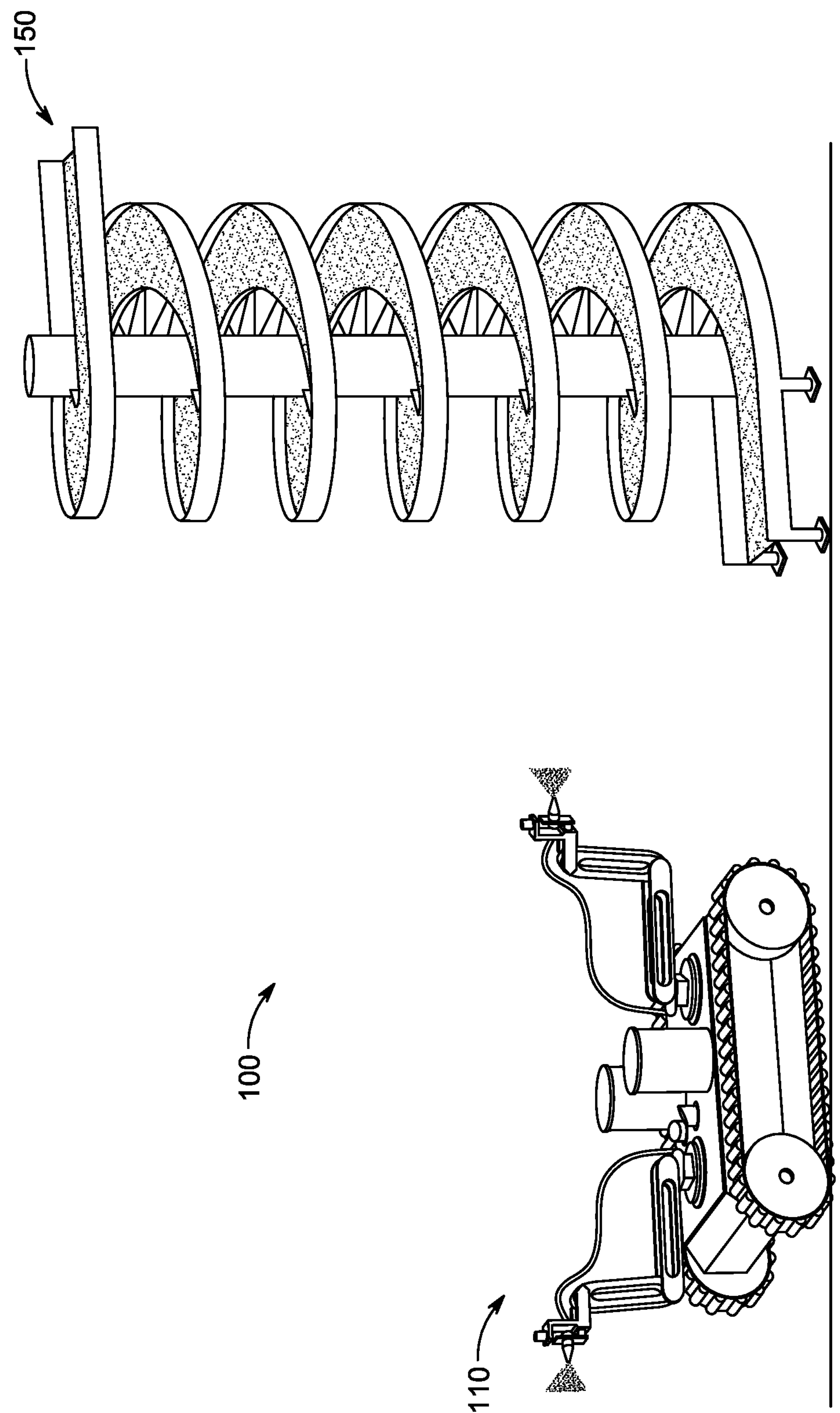
FIG. 1 is a diagrammatic illustration of a vertical farming spraying system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a vertical farming spraying system for precise humidification and disinfection within vertical farming environments. The vertical farming spraying system includes a robotic mobile sprayer that is designed to navigate a vertically oriented elongated cylindrical support surrounded by a spiral path, enabling precise and controlled application of moisture and disinfectants within vertical farming setups. Unlike traditional systems that rely heavily on manual labor and less precise spraying mechanisms, the vertical farming spraying system of the present disclosure automates the process, reducing labor costs and improving the uniformity of application. Furthermore, the vertical farming spraying system allows for scalability and adaptability to various vertical farming configurations, making it a versatile solution for modern agricultural needs.

Referring to FIG. 1, illustrated is a vertical farming spraying system (as represented by reference numeral 100), in accordance with embodiments of the present disclosure. The vertical farming spraying system 100 is an advanced agricultural mechanism designed specifically for the unique environment of vertical farms. Vertical farming is an innovative method of growing plants in vertically stacked layers, often incorporating soilless farming techniques such as hydroponics, aeroponics, or aquaponics. These vertical farms can be housed in buildings, warehouses, or specially designed structures, enabling agriculture in urban settings or areas with limited arable land. The vertical farming spraying system 100 is implemented for automated and precise delivery of water, disinfectants, and sometimes nutrients directly to the plants. Given the high-density and layered nature of vertical farms, traditional watering and pest management methods are often inefficient or impractical. The vertical farming spraying system 100 is configured to reach higher elevations within the vertical farming setup, ensuring that plants positioned at various heights receive consistent and precise application of water and disinfectants.

As illustrated, the vertical farming spraying system 100 includes a robotic mobile sprayer 110. The robotic mobile sprayer 110 is configured to efficiently distribute water and disinfectants across the multiple layers of plants within the vertical farming environment. The robotic mobile sprayer 110 is designed to navigate intricate layouts of vertical farms, which often consist of tightly spaced plants arranged in vertical arrays. The robotic mobile sprayer 110 is configured to administer moisture and disinfectants in a controlled manner, allowing for the customization of feed based on specific plant needs. This precision in delivery achieved by use of the robotic mobile sprayer 110 can lead to healthier plants and higher yields.

Figure 2:
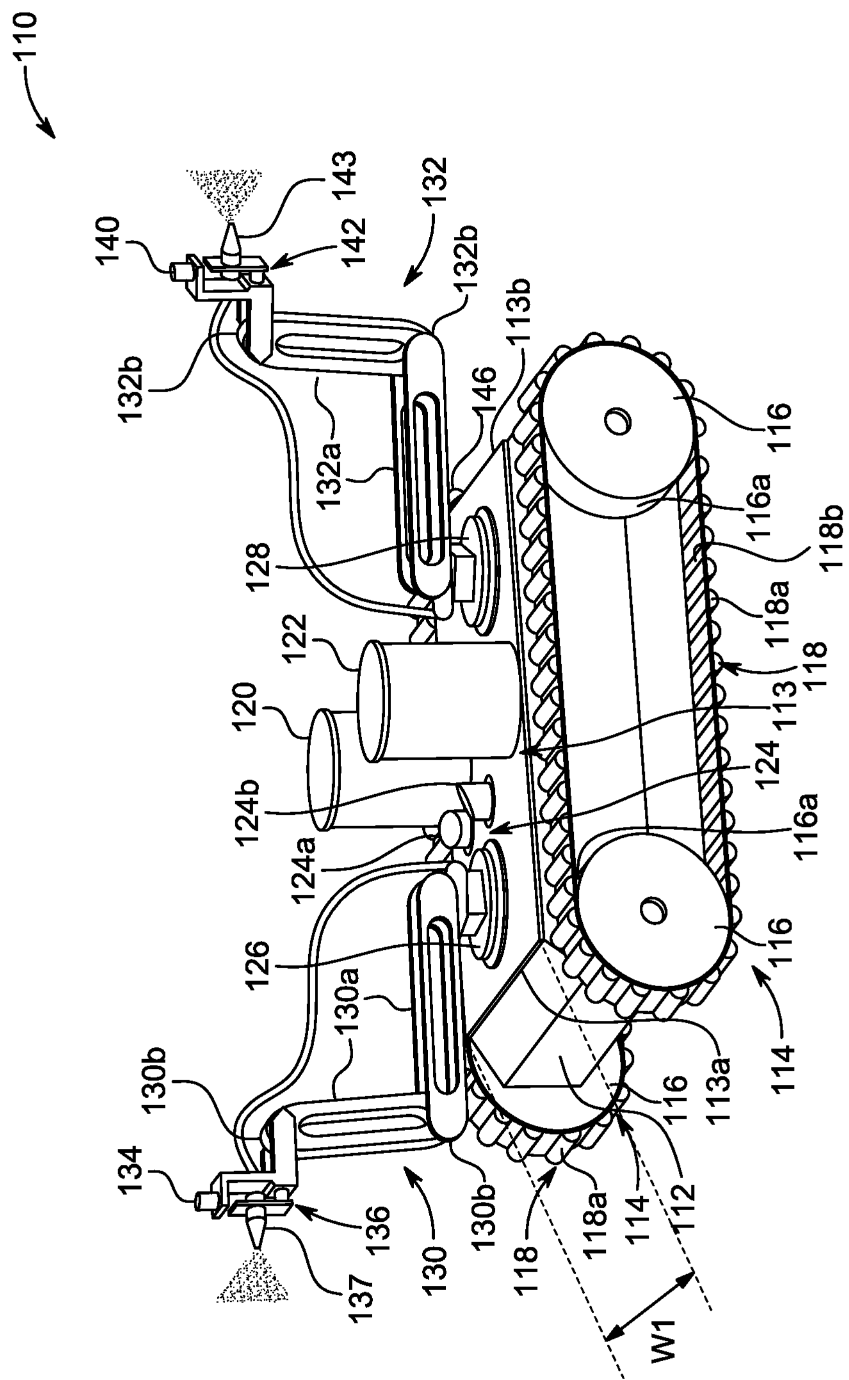
FIG. 2 is a diagrammatic illustration of a robotic mobile sprayer of the vertical farming spraying system, according to certain embodiments.

Referring to FIG. 2, illustrated is a detailed diagram of the robotic mobile sprayer 110. As illustrated, the robotic mobile sprayer 110 includes a base 112 having a rectangular body. The base 112 serves as the platform to which other components of the robotic mobile sprayer 110 are mounted. The rectangular body of the base 112 provides structural support and stability, facilitating the integration of additional system components for the operation of the robotic mobile sprayer 110. The base 112 is coupled with a pair of driving members 114. The pair of driving members 114 are integral to the mobility of the robotic mobile sprayer 110. Each driving member within the pair of driving members 114 includes at least two wheels 116. These wheels 116 are positioned in such a manner as to enable and support the rotational motion required for traversal across the vertical farming structure. Furthermore, a track 118 is mounted on the at least two wheels 116 of each driving member of the pair of driving members 114. The configuration of the track 118 being driven around the at least two wheels 116 enables the robotic mobile sprayer 110 to maneuver with precision within the vertical farming environment. In particular, the track 118, interfacing with the at least two wheels 116, is configured to facilitate movement over diverse terrains and surfaces, which may be encountered within the vertical farming structure. The engagement between the track 118 and the at least two wheels 116 allows for a controlled and stable movement of the robotic mobile sprayer 110, ensuring that the necessary tasks of humidification and disinfection can be conducted with consistent reach and coverage by the vertical farming spraying system 100.

Herein, each track 118 includes an outer surface **118*a* and an inner surface 118*b*. Each track 118 has the inner surface 118*b* in contact with an outer surface 116*a* of each of the at least two wheels 116. That is, each track 118 is designed with the inner surface 118*b* that maintains contact with the outer surface 116*a* of each wheel among the at least two wheels 116. This interface between the inner surface 118*b* of the track 118 and the outer surface 116*a* of the wheels ensures a secure engagement, facilitating the transmission of motion from the wheels 116 to the tracks 118, and consequently, the movement of the robotic mobile sprayer 110**.

In the present configuration, at least one wheel of the at least two wheels 116 is a drive wheel. Such drive wheel, from the at least two wheels 116, is responsible for imparting the motion necessary for the track 118 to travel around the at least two wheels 116, thereby propelling the robotic mobile sprayer 110 along the intended path. It may be appreciated that the drive wheel, from the at least two wheels 116, may be powered by a drive member (e.g., disposed within the base 112 or directly connected to the drive wheel), like electric motors coupled to a battery, or the like. The drive wheel among the wheels 116 ensures the provision of adequate torque and control for the movement of the robotic mobile sprayer 110 within the vertical farming environment.

In an embodiment, each track 118 is formed of an elastomeric material. The choice of elastomeric material for the tracks 118 provides the tracks 118 with flexibility and durability, allowing for efficient movement and traction across the varied terrains within the vertical farming setup. The elastomeric nature of the tracks 118 enables the robotic mobile sprayer 110 to navigate the vertical farming environment effectively, contributing to the overall robustness of the vertical farming spraying system 100.

Also, as illustrated, the robotic mobile sprayer 110 includes a first cylindrical element 120 and a second cylindrical element 122. The first cylindrical element 120 and the second cylindrical element 122 are affixed to a top portion 113 of the base 112. These cylindrical elements 120, 122 are used to contain the liquids required for operations of the robotic mobile sprayer 110. For purposes of the present disclosure, the first cylindrical element 120 is utilized to contain water for humidification purposes and the second cylindrical element 122 is utilized to contain disinfectant fluid for disinfection purposes. The robotic mobile sprayer 110 further includes a pair of pumps 124 (also shown in FIG. 4) for the fluid transfer. The pair of pumps 124 are at least partially disposed in the base 112. Specifically, the pair of pumps 124 includes a first pump **124*a* and a second pump 124*b*. The first pump 124*a* from the pair of pumps 124 is connected to the first cylindrical element 120, facilitating transfer of the water to the designated dispensing apparatus. Similarly, the second pump 124*b* from the pair of pumps 124 is connected to the second cylindrical element 122, facilitating transfer of the disinfectant solution. In an example, the first pump 124*a* and the second pump 124*b* are submerged pumps, with the first pump 124*a* submerged in the first cylindrical element 120 and the second pump 124*b* submerged in the second cylindrical element 122. This arrangement within the robotic mobile sprayer 110 ensures that the necessary liquids are transferred from the first cylindrical element 120 and the second cylindrical element 122 to their respective discharge points (as discussed later in more detail) in a controlled and efficient manner, as per the operational requirements of the vertical farming spraying system 100**.

In an embodiment, the pair of pumps 124 are peristaltic pumps. That is, the first pump **124*a* and the second pump 124*b* of the pair of pumps 124** operate based on the peristaltic mechanism, which involves the rhythmic contraction and relaxation of a flexible hose or tube to propel liquids forward. This type of pump is well-suited for handling a variety of fluids without the risk of contamination, as the fluid only contacts the interior of the tubing. This feature is particularly advantageous in applications in which maintaining the purity of the fluid, such as water, nutrient solutions, or disinfectants, is required, as is often the case in vertical farming operations.

Further, as illustrated, the robotic mobile sprayer 110 includes a first flat plate 126 and a second flat plate 128. The first flat plate 126 is coupled proximal to a first end **113*a* of the top portion 113 of the base 112. The second flat plate 128 is coupled proximal to a second end 113*b* of the top portion 113 of the base 112. The robotic mobile sprayer 110 also includes a first mechanical support 130 mounted on the first flat plate 126 and a second mechanical support 132 mounted on the second flat plate 128. The first mechanical support 130 and the second mechanical support 132 are designed to support additional elements of the robotic mobile sprayer 110, such as sprayers and sensors, at appropriate elevations and orientations (as discussed later in more detail). The placement of the first mechanical support 130 and the second mechanical support 132 on the top portion 113 of the base 112 allows for an optimal range of operation for the devices they support, facilitating effective coverage over the vertical farming area. Further, the parallel configuration of the first mechanical support 130 and the second mechanical support 132 on their respective flat plates 126, 128 provides a symmetrical structure, contributing to the balanced design of the robotic mobile sprayer 110 within the vertical farming spraying system 100**.

Herein, the first mechanical support 130 is configured to rotate about the first flat plate 126. That is, the first mechanical support 130 is configured to exhibit rotational movement around the first flat plate 126. This configuration allows for dynamic positioning and orientation of any components mounted on the first mechanical support 130, facilitating the ability to adjust their angles and reach for optimal application of liquids. Similarly, the second mechanical support 132 is configured to rotate about the second flat plate 128. This rotational feature of the second mechanical support 132 mirrors the functionality of the first mechanical support 130, providing similar directional control of attached components, such as nozzles or sensors, to ensure thorough coverage within the vertical farming environment. In general, the rotational configurations of the first mechanical support 130 and the second mechanical support 132 enhance the reach of the robotic mobile sprayer 110, enabling it to adapt its spray patterns and sensor orientations as required by the varying conditions of the vertical farm.

Further, as depicted, each of the first mechanical support 130 and the second mechanical support 132 includes a set of bars **130*a*, 132*a* and a set of joints 130*b*, 132*b*. The sets of bars 130*a*, 132*a* are integral to the framework of the mechanical supports 130, 132, providing the necessary structure for mounting and operation. The sets of joints 130*b*, 132*b* serve as pivotal connection points within the mechanical supports 130, 132, facilitating the assembly and articulation of the bars 130*a*, 132*a*. Herein, the set of joints 130*b*, 132*b* are connection points between the set of bars 130*a*, 132*a*. Such configuration of the bars 130*a*, 132*a* and the joints 130*b*, 132*b* allows for rotational and other movements, which enable the mechanical supports 130, 132 to achieve the required positioning and orientation of attached devices such as sprayers and sensors. The configuration of the bars 130*a*, 132*a* interconnected by joints 130*b*, 132*b*, thus, provides a flexible architecture within the first mechanical support 130 and the second mechanical support 132, allowing for adaptable positioning while maintaining stability of the mechanical supports 130, 132, and thereby contributing to the overall functionality of the vertical farming spraying system 100**.

The robotic mobile sprayer 110 further includes a humidity sensor 134 and a humidifier sprayer 136 mounted on the first mechanical support 130. The humidity sensor 134 is configured for monitoring the ambient humidity levels (in proximity) within the vertical farming environment, ensuring that the conditions are optimal for plant growth and health. The humidifier sprayer 136 is positioned to dispense water or moisture based on the readings obtained from the humidity sensor 134 (as discussed later in detail in reference to FIG. 4). Further, in the robotic mobile sprayer 110, a first set of micro-jets 137 is mounted on the humidifier sprayer 136, facilitating the fine dispersion of moisture across the vertical farming environment. The first set of micro-jets 137 ensures that the water delivered by the humidifier sprayer 136 is atomized into ultra-fine droplets, allowing for a more uniform and efficient humidification process. The first set of micro-jets 137 enables the humidifier sprayer 136 to cover a broad area with a fine mist, optimizing water usage and ensuring that plants receive the moisture they need without excess.

Figure 4:
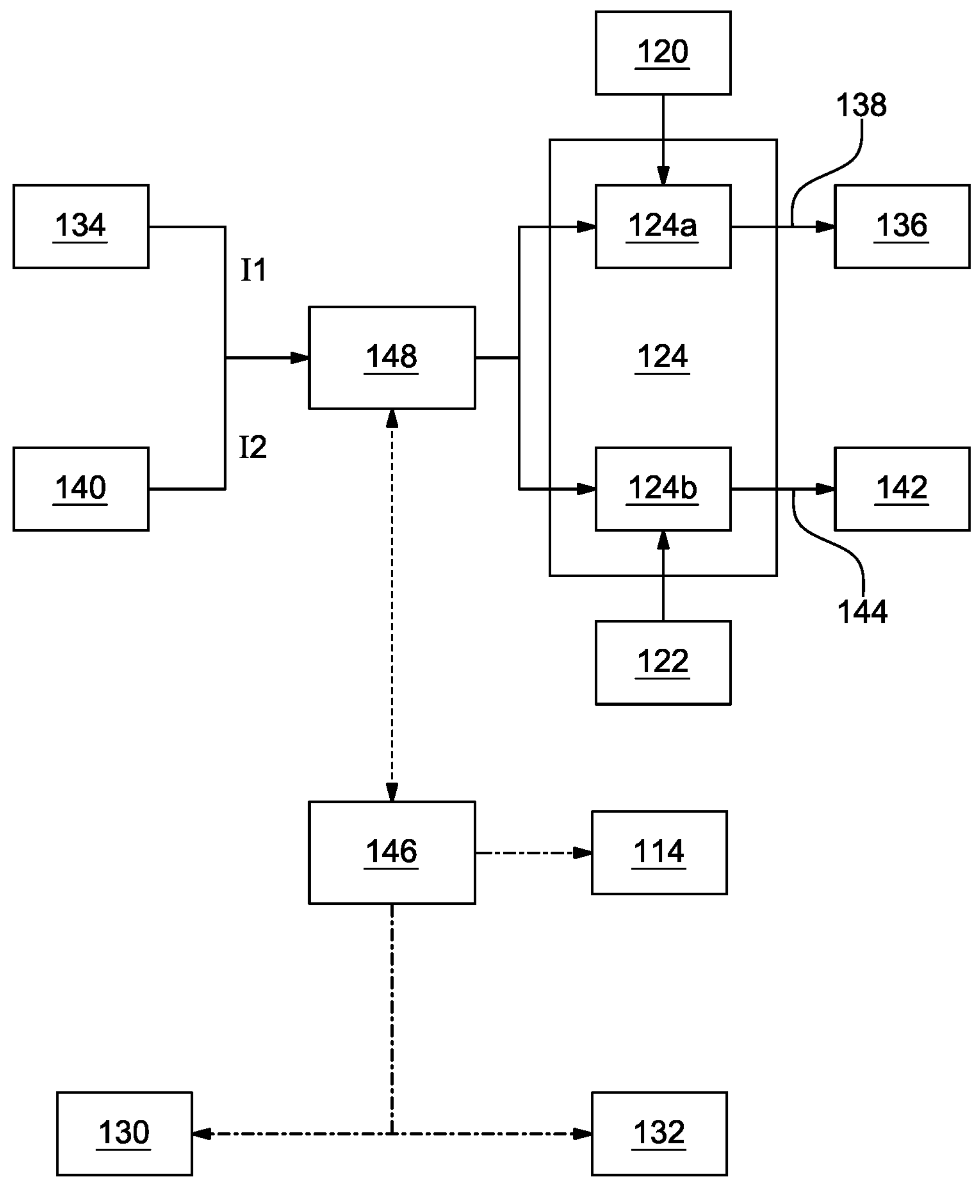
FIG. 4 is a schematic diagram of a control scheme for the robotic mobile sprayer, according to certain embodiments.

In the present configuration, the humidifier sprayer 136 is fluidly connected to the first pump 124*a* through a first conduit 138 (as schematically illustrated in FIG. 4). This fluid connection allows for the transmission of moisture or water from its source (i.e., the first cylindrical element 120 connected to the first pump 124*a*, as discussed) to the point of dispersion within the vertical farming environment. Herein, the first pump 124*a* draws the water from the first cylindrical element 120, pressurizes it, and then channels it through the first conduit 138, providing water flow from the first cylindrical element 120 to the humidifier sprayer 136. This fluid connection allows for maintaining optimal humidity levels within the vertical farming space, ensuring the plants receive the moisture they need for healthy growth using the vertical farming spraying system 100.

The integration of the humidity sensor 134 and the humidifier sprayer 136 on the first mechanical support 130 provides required reach to plants in the vertical farm setup to perform the said functions. The humidity sensor 134 and the humidifier sprayer 136 provide a consolidated approach to managing the microclimate of the vertical farming area. This arrangement ensures that the delivery of moisture by the humidifier sprayer 136 is both responsive and accurate, directly correlating to the real-time humidity requirements as indicated by the humidity sensor 134, thereby optimizing the environmental conditions for the cultivation of plants in the vertical farming spraying system 100.

The robotic mobile sprayer 110 also includes a disinfection sensor 140 and a disinfection sprayer 142 mounted on the second mechanical support 132. The disinfection sensor 140 is configured for detecting the need for disinfectant application within the vertical farming environment, ensuring the prevention of disease spread and maintenance of plant health. The disinfection sprayer 142 is positioned to dispense disinfectant solutions based on the readings obtained from the disinfection sensor 140 (as discussed later in detail in reference to FIG. 4). Further, in the robotic mobile sprayer 110, a second set of micro-jets 143 is mounted on the disinfection sprayer 142, facilitating the precise application of disinfectant solutions. The second set of micro-jets 143 ensures that the liquid delivered by the disinfection sprayer 142 is finely atomized. The second set of micro-jets 143 permits the disinfection sprayer 142 to achieve thorough coverage of plant surfaces, ensuring effective disinfection and disease prevention throughout the vertical farming setup.

In the present configuration, the disinfection sprayer 142 is fluidly connected to the second pump 124*b* through a second conduit 144 (as schematically illustrated in FIG. 4). This fluid connection allows for the transmission of the disinfectant solution from its source (i.e., the second cylindrical element 122 connected to the second pump 124*b*, as discussed) to the point of application within the vertical farming environment. The second pump 124*b* draws the disinfectant from the second cylindrical element 122, pressurizes it, and then channels it through the second conduit 144, providing disinfectant flow from the second cylindrical element 122 to the disinfection sprayer 142. This fluid connection ensures the delivery of the disinfectant solution to the targeted areas, maintaining the required conditions necessary for the thriving of plants using the vertical farming spraying system 100.

The integration of the disinfection sensor 140 and the disinfection sprayer 142 on the second mechanical support 132 provides required reach to plants in the vertical farm setup to perform the said functions. The disinfection sensor 140 and the disinfection sprayer 142 provide a consolidated approach to targeting the elimination of pathogens to sustain an optimal growing environment. This arrangement ensures that the application of disinfectants by the disinfection sprayer 142 is both reactive and precise, directly correlating to the real-time needs for disinfection as detected by the disinfection sensor 140, thereby contributing to the health management of plants within the vertical farming spraying system 100.

The robotic mobile sprayer 110 further includes a control unit 146. The control unit 146 serves as the central processing and command center for the robotic mobile sprayer 110 within the vertical farming spraying system 100. The control unit 146 is an electronic processing module, providing the necessary computational power and connectivity to manage and coordinate the various functions of the robotic mobile sprayer 110. This control unit 146 is equipped with a microprocessor or microcontroller that executes pre-programmed instructions tailored to the operational requirements of the robotic mobile sprayer 110. These instructions enable the control unit 146 to interpret data received from sensors, such as the humidity sensor 134 and the disinfection sensor 140, and to make real-time decisions regarding the movement and spraying actions of the vertical farming spraying system 100.

As generally shown in FIG. 2, the control unit 146 is coupled to the base 112. It may be appreciated that the control unit 146 may be mounted onto the base 112 by any suitable means, such as fasteners and the like. In some examples, the control unit 146 may be encased in a durable housing to protect against environmental factors commonly found in vertical farms, such as moisture and varying temperatures. Further, as shown in FIG. 4, the control unit 146 is in electrical communication with each driving member 114, the first mechanical support 130, and the second mechanical support 132. The control unit 146 by means of communication with each driving member 114 facilitates the direct control and coordination of the movement mechanisms of the robotic mobile sprayer 110. This includes the regulation of the at least two wheels 116 and the tracks 118 that form part of each driving member 114, enabling the robotic mobile sprayer 110 to traverse landscape of the vertical farm effectively. Additionally, the control unit 146 by means of communication with the first mechanical support 130 and the second mechanical support 132 governs the positioning and operation of components mounted on these mechanical supports 130, 132, such as the sprayers 136, 142, along with their respective sensors 134, 140.

In the present configuration, the humidifier sprayer 136 and the disinfection sprayer 142 are configured to move in a three-dimensional manner. This feature allows for comprehensive coverage, enabling the sprayers 136, 142 to reach plants at various heights and angles within the vertical farming setup, thereby ensuring uniform application of moisture and disinfectants across all plant surfaces. To facilitate this three-dimensional movement, the control unit 146 is configured to control a rotation of each of the first mechanical support 130 and the second mechanical support 132. This control extends to adjusting the orientation and position of the humidifier sprayer 136 and the disinfection sprayer 142 mounted on the mechanical supports 130, 132, respectively. By regulating the rotation of the first mechanical support 130 and the second mechanical support 132, and, optionally, further by enabling the sprayers 136, 142 to pivot and angle themselves (for instance, using the bars 130*a*, 132*a* and the joints 130*b*, 132*b* of the mechanical supports 130, 132) as needed to optimize the spraying process, the control unit 146 caters to the specific requirements of the plants and the environment within the vertical farming spraying system 100.

Also, as shown in FIG. 4, the control unit 146 is in electrical communication with a flow control sensor 148 connected to the first pump 124*a*, the second pump 124*b*, the humidity sensor 134, and the disinfection sensor 140. The flow control sensor 148 is configured for monitoring and regulating the flow rates of the liquids being pumped by the first pump 124*a* and the second pump 124*b*, ensuring precise delivery of water and disinfectants from the humidifier sprayer 136 and the disinfection sprayer 142, respectively. By maintaining such electrical communication with these components, the control unit 146 is able to process the data collected by the sensors 134, 140 and adjust the operations of the pumps 124*a*, 124*b* accordingly via the flow control sensor 148. Specifically, the integration of the flow control sensor 148 with the control unit 146 allows for the synchronization of fluid delivery with the environmental conditions detected by the humidity sensor 134 and the disinfection sensor 140. This coordination ensures that the spraying actions are responsive to the real-time needs of the vertical farming environment, optimizing the use of resources and maintaining the health of the plants within the vertical farming spraying system 100.

In the present configuration, as depicted in FIG. 4, the flow control sensor 148 is configured to receive a first set of inputs 'Il' from the humidity sensor 134 and control a pumping action of the first pump 124*a* based on the first set of inputs 'Il'. Herein, the first set of inputs 'Il' represents data related to the ambient humidity levels within the vertical farming environment, for determining the necessary moisture requirements of the plants. Upon receiving the first set of inputs 'Il', the flow control sensor 148, in conjunction with the control unit 146, processes this information and correspondingly adjusts the pumping action of the first pump 124*a*. Here, the pumping action of the first pump 124*a* controls a moisture output of the humidifier sprayer 136 based on the first set of inputs 'Il' from the humidity sensor 134. That is, based on the first set of inputs 'Il', the first pump 124*a* modulates its pumping action to adjust the volume and rate of water flow. This regulated flow of water is then directed towards the humidifier sprayer 136, for the dispersion of moisture into the surrounding environment of the vertical farm. This ensures that the amount of water being pumped and subsequently dispensed by the humidifier sprayer 136 is in direct correlation with the humidity needs as indicated by the humidity sensor 134, and that the plants receive the optimal level of hydration necessary for their growth and health.

Further, as depicted, the flow control sensor 148 is configured to receive a second set of inputs '12' from the disinfection sensor 140 and control a pumping action of the second pump 124*b* based on the second set of inputs '12'. Herein, the second set of inputs '12' represents data pertaining to the presence of pathogens or the need for sanitization, for determining the disinfection process. Upon receiving the second set of inputs '12', the flow control sensor 148, in conjunction with the control unit 146, processes this information and correspondingly adjusts the pumping action of the second pump 124*b*. Here, the pumping action of the second pump 124*b* controls a disinfectant output of the disinfection sprayer 142 based on the second set of inputs '2' from the disinfection sensor 140. That is, based on the second set of inputs '12', the second pump 124*b* modulates its pumping action to adjust the volume and rate of disinfectant flow. This regulated flow of disinfectant is then directed towards the disinfection sprayer 142, facilitating the targeted application of disinfectants to the plants and surfaces within the vertical farm. This ensures that the dispensation of disinfectants by the disinfection sprayer 142 is directly correlated with the sanitization demands as indicated by the disinfection sensor 140, thus maintaining an optimal balance between plant health and environmental cleanliness.

Figure 3:
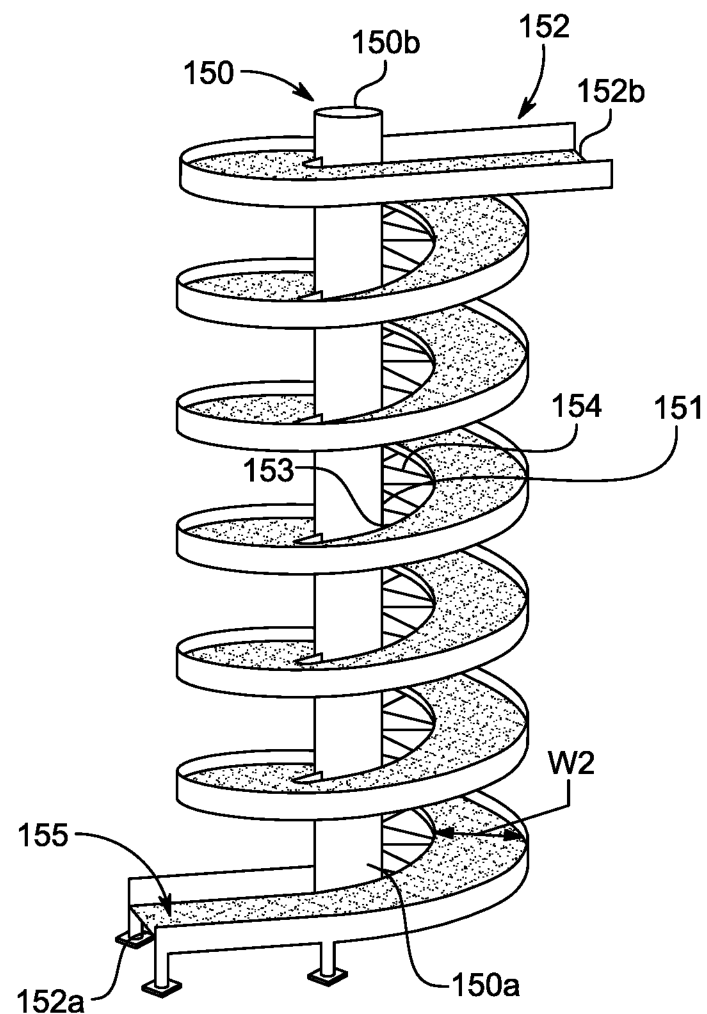
FIG. 3 is a diagrammatic illustration of the vertically oriented elongated cylindrical support with a spiral path, of the vertical farming spraying system, according to certain embodiments.

Referring back to FIG. 1, as illustrated, the vertical farming spraying system 100 also includes a vertically oriented elongated cylindrical support 150. The vertically oriented elongated cylindrical support 150 is designed to extend vertically reaching a height almost equal to a height of the vertical farm (i.e. up to the last layer of plants in the vertical farm). The vertically oriented elongated cylindrical support 150 is surrounded by a spiral path 152. The spiral path 152 is laid out around the vertically oriented elongated cylindrical support 150, facilitating a guided route for the robotic mobile sprayer 110 to navigate along the vertical expanse. The inclusion of the spiral path 152 ensures that the robotic mobile sprayer 110 can ascend and descend along the vertically oriented elongated cylindrical support 150, reaching various levels of the vertical farming setup to perform the spraying tasks effectively. Referring to FIG. 3, as shown, the spiral path 152 begins at the start point 152*a*, strategically located at the base 150*a* of the vertically oriented elongated cylindrical support 150, and winds upwards in a spiral fashion around the vertically oriented elongated cylindrical support 150 to terminate at the end point 152*b*, positioned at the top 150*b* of the vertically oriented elongated cylindrical support 150.

Further, as shown in FIG. 3, the vertically oriented elongated cylindrical support 150 includes a plurality of projections 154 extending from an outer surface 151 of the vertically oriented elongated cylindrical support 150. The projections 154 are distributed and extend outward from the outer surface 151, contributing to the structural rigidity of the vertically oriented elongated cylindrical support 150. The projections 154 also serve as points to connect to other components. As shown, the spiral path 152 includes an inner edge 153 in contact with the projections 154 of the vertically oriented elongated cylindrical support 150. Such mechanical connection between the vertically oriented elongated cylindrical support 150 and the spiral path 152 provide an integral structure, to provide a secure and stable base for traversal of the robotic mobile sprayer 110 as it moves along the spiral path 152, such that the robotic mobile sprayer 110 can ascend and descend the vertically oriented elongated cylindrical support 150, allowing for effective coverage and treatment of the plants situated at various heights within the vertical farming setup.

In the present configuration, a width 'W2' of the spiral path 152 is at least 1.2 times a width 'W1' of the base 112 of the robotic mobile sprayer 110. This dimensional relationship ensures that there is sufficient space for the robotic mobile sprayer 110 to navigate the spiral path 152 without impediment, allowing for smooth and efficient movement along the vertically oriented elongated cylindrical support 150. The choice of making the width 'W2' of the spiral path 152 significantly larger than the width 'W1' of the base 112 also contributes to the stability of the robotic mobile sprayer 110 as it performs its functions, preventing any potential obstructions or navigational difficulties that could arise from a narrower path. Also, each track 118, of the robotic mobile sprayer 110, has an outer surface 118*a* configured to engage with a top surface 155 of the spiral path 152. This engagement ensures that the robotic mobile sprayer 110 maintains traction and stability as it moves along the spiral path 152, navigating the vertically oriented elongated cylindrical support 150 within the vertical farming spraying system 100. Such design configuration facilitates a smooth and controlled movement of the robotic mobile sprayer 110, optimizing its operational efficiency in the vertical farming environment.

Figure 5A:
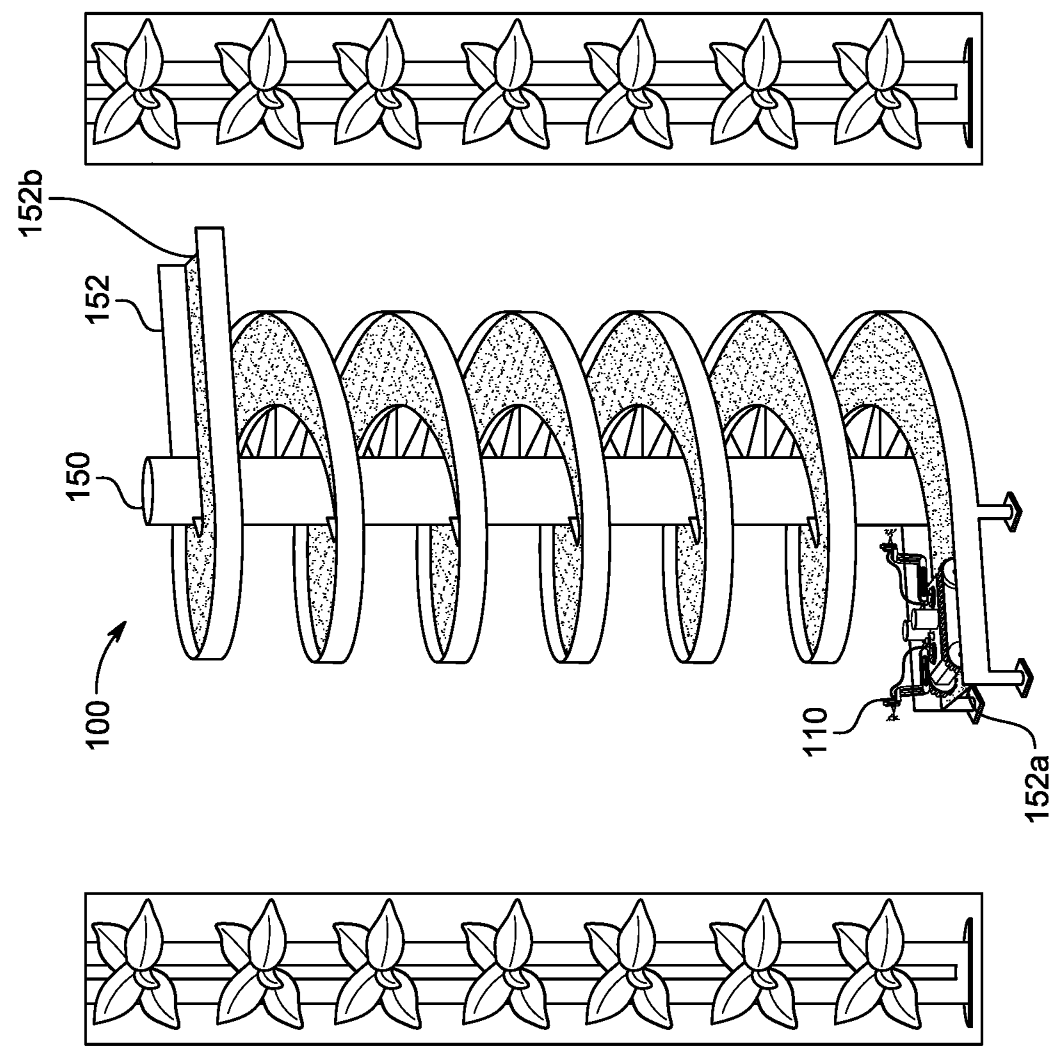
FIG. 5A is a depiction of operation of the robotic mobile sprayer, located at a start point on the spiral path, in the vertical farming spraying system, according to certain embodiments.
Figure 5B:
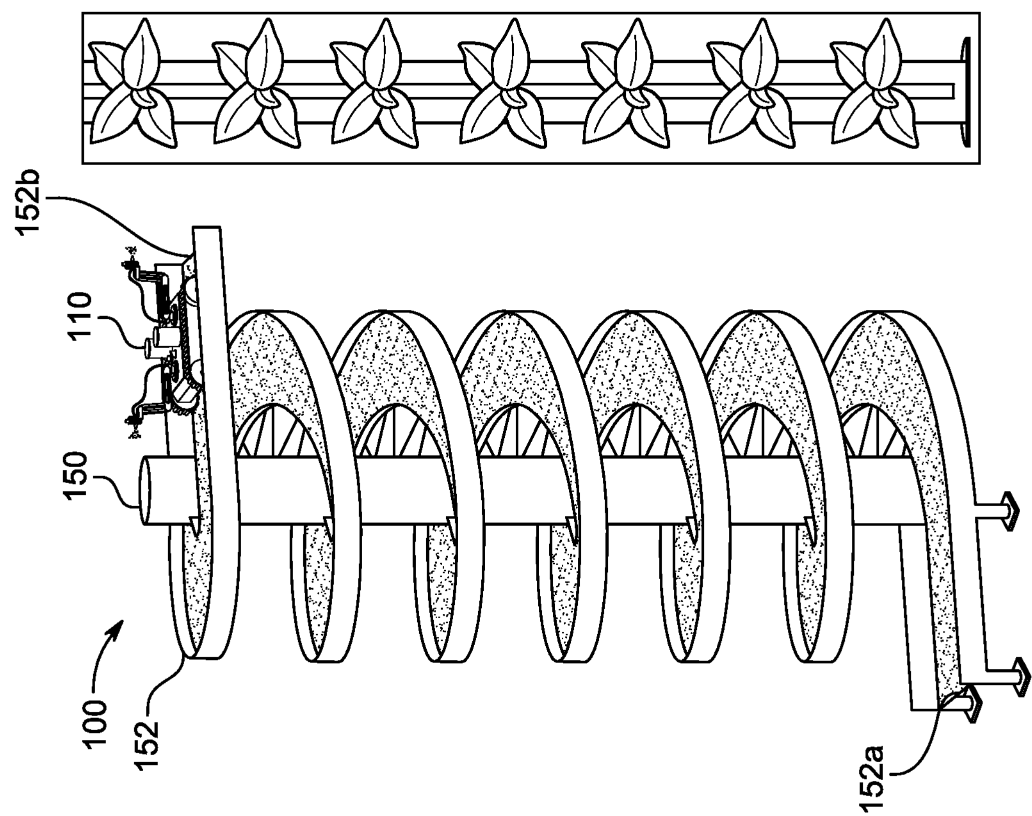
FIG. 5B is a depiction of operation of the robotic mobile sprayer, located at an end point on the spiral path, in the vertical farming spraying system, according to certain embodiments.

FIGS. 5A and 5B are depictions of operation of the robotic mobile sprayer 110 on the spiral path 152, in the vertical farming spraying system 100. The spiral path 152 is configured to constrict locomotion of the robotic mobile sprayer 110 from a start point 152*a* on the spiral path 152 at a base 150*a* of the vertically oriented elongated cylindrical support 150 up to an end point 152*b* on the spiral path 152 at a top 150*b* of the vertically oriented elongated cylindrical support 150. The spiral path 152 is specifically designed to guide and restrict the movement of the robotic mobile sprayer 110 in a controlled manner. As the robotic mobile sprayer 110 starts its journey along the spiral path 152 from the start point 152*a*, it is constrained by design of the spiral path 152 to follow a predetermined route that leads it through various levels of the vertical farming setup. This ensures that the robotic mobile sprayer 110 systematically covers all areas, providing uniform application of water, nutrients, and disinfectants as needed. Such configuration of the spiral path 152, controlling the movement from the start point 152*a* to the end point 152*b*, ensures that the robotic mobile sprayer 110 efficiently navigates the entire height of the vertical farming structure, making it possible to tend to plants at every level without manual intervention.

Herein, the control unit 146 is configured to drive the track 118 around the at least two wheels 116 and move the base 112 along the spiral path 152. That is, the control unit 146 within the robotic mobile sprayer 110 is programmed to manage the movement mechanisms thereof, by actively controlling the rotation of the track 118 around the circumference of the wheels 116 for the propulsion of the base 112 of the robotic mobile sprayer 110. The control unit 146 further ensures that the base 112 of the robotic mobile sprayer 110 follows the spiral path 152, maneuvering up and down the vertically oriented elongated cylindrical support 150. This precise control over the movement of the robotic mobile sprayer 110 along the spiral path 152 helps in achieving comprehensive coverage within the vertical farming setup, enabling the robotic mobile sprayer 110 to perform its humidifying and disinfection tasks efficiently across all levels of the vertical farm setup.

The vertical farming spraying system 100 is designed with ease of setup, such that the robotic mobile sprayer 110, the vertically oriented elongated cylindrical support 150, and the spiral path 152 can be efficiently assembled, reducing the time and technical expertise required to get the system operational. It may be contemplated that the vertical farming spraying system 100 allows for easy adaptation to various settings beyond vertical farming. The modular design and versatile components of the vertical farming spraying system 100 allow for integration into various settings that require precise and controlled spraying capabilities. For instance, the system can be adapted for use in greenhouses, where environmental control is crucial, or in indoor farming setups that utilize hydroponics or aeroponics. Further, with minor modifications, which may be contemplated by a person skilled in the art, the vertical farming spraying system 100 may also be adapted for humidity control in other industries, such as food and beverages, dairy farms, pharmaceutical industry, printing and textile industry, without any limitations.

The vertical farming spraying system 100 of the present disclosure provides a scalable, adaptable, and efficient solution for modern farming challenges, particularly vertical farming. By automating the humidification and disinfection processes, the vertical farming spraying system 100 significantly reduces water and chemical usage, lowering operational costs and minimizing the environmental impact, making it a more sustainable alternative to conventional methods. The integration of sensors, pumps, and robotic mobility allows for precise control over environmental conditions, reducing the reliance on energy-intensive solutions like air conditioning. The targeted approach ensures that resources are used only where and when needed, enhancing overall efficiency. The automation of tasks traditionally performed manually, such as the spraying of disinfectants, not only reduces labor costs but also minimizes human error, ensuring a more consistent and reliable maintenance of optimal growing conditions.

Figure 6:
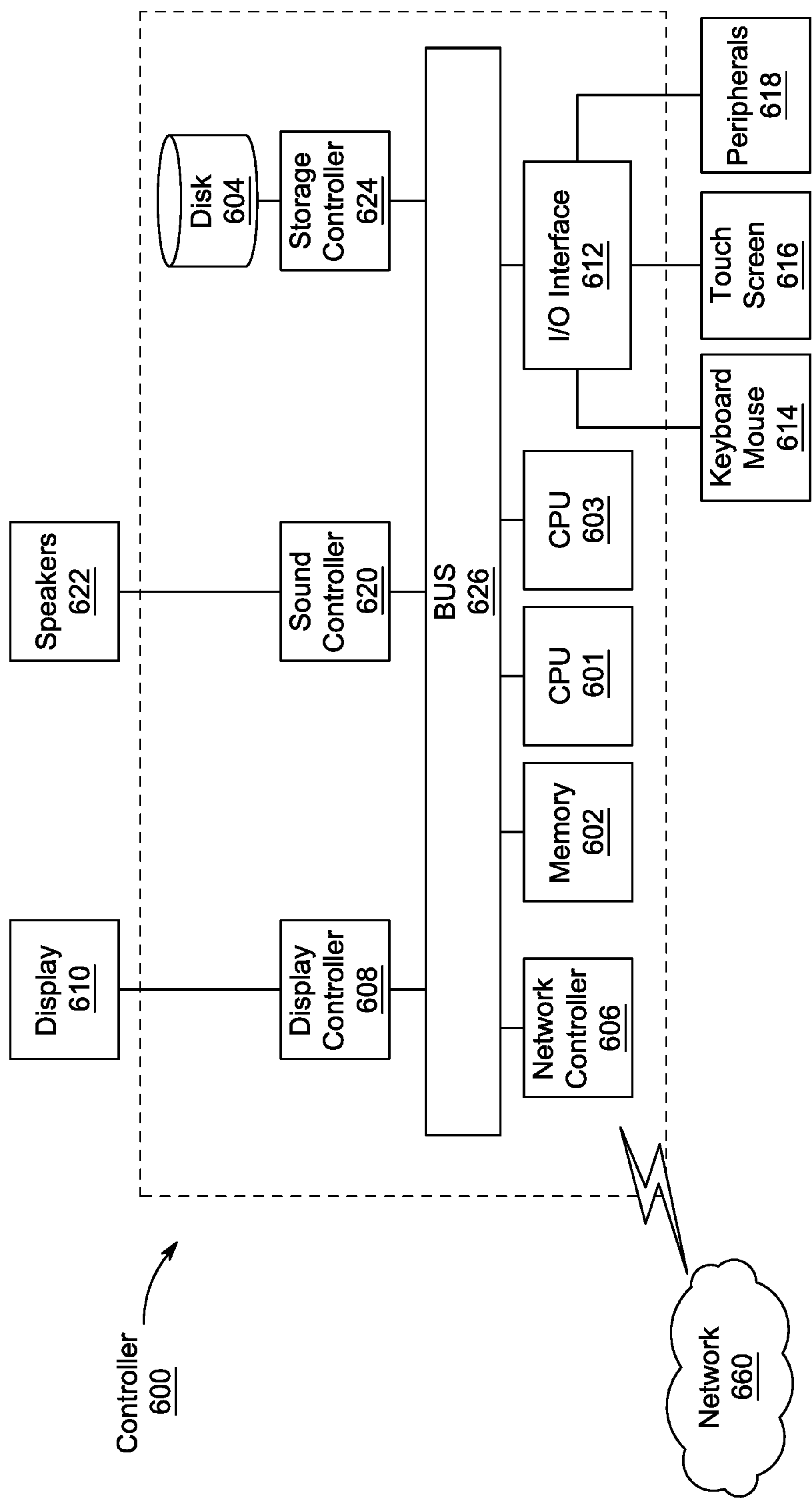
FIG. 6 is an illustration of a non-limiting example of details of computing hardware used in the computing system, according to certain embodiments.

Next, further details of the hardware description of the computing environment according to exemplary embodiments is described with reference to FIG. 6. In FIG. 6, a controller 600 is described which may embody the control unit 146, in which the controller 600 is a computing device which includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, Microsoft Windows 8, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN subnetworks. The network 660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
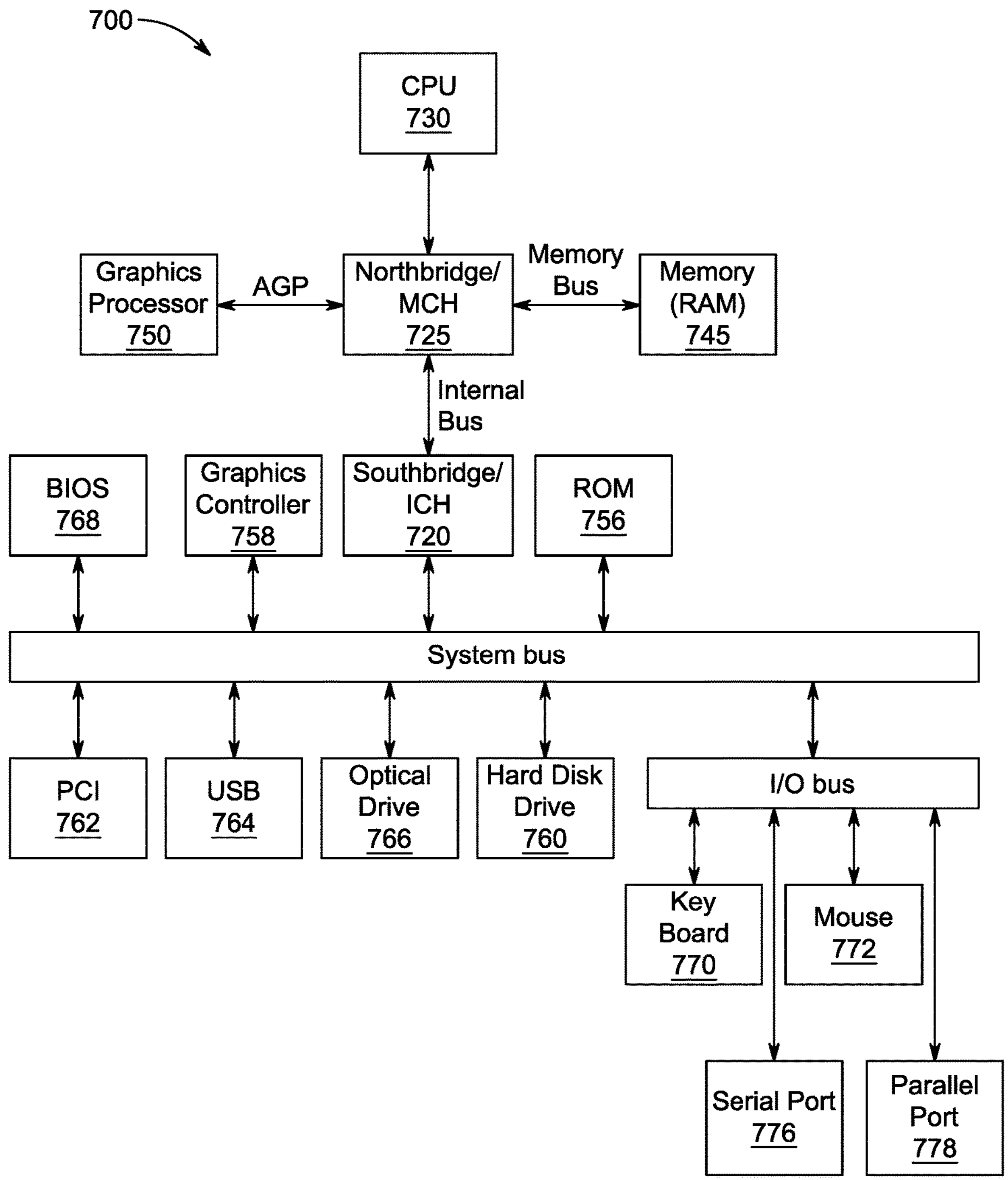
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface).

The CPU Processing unit 730 may contain one or more processors and even may be implemented using one or more heterogeneous processor systems.

Figure 8:
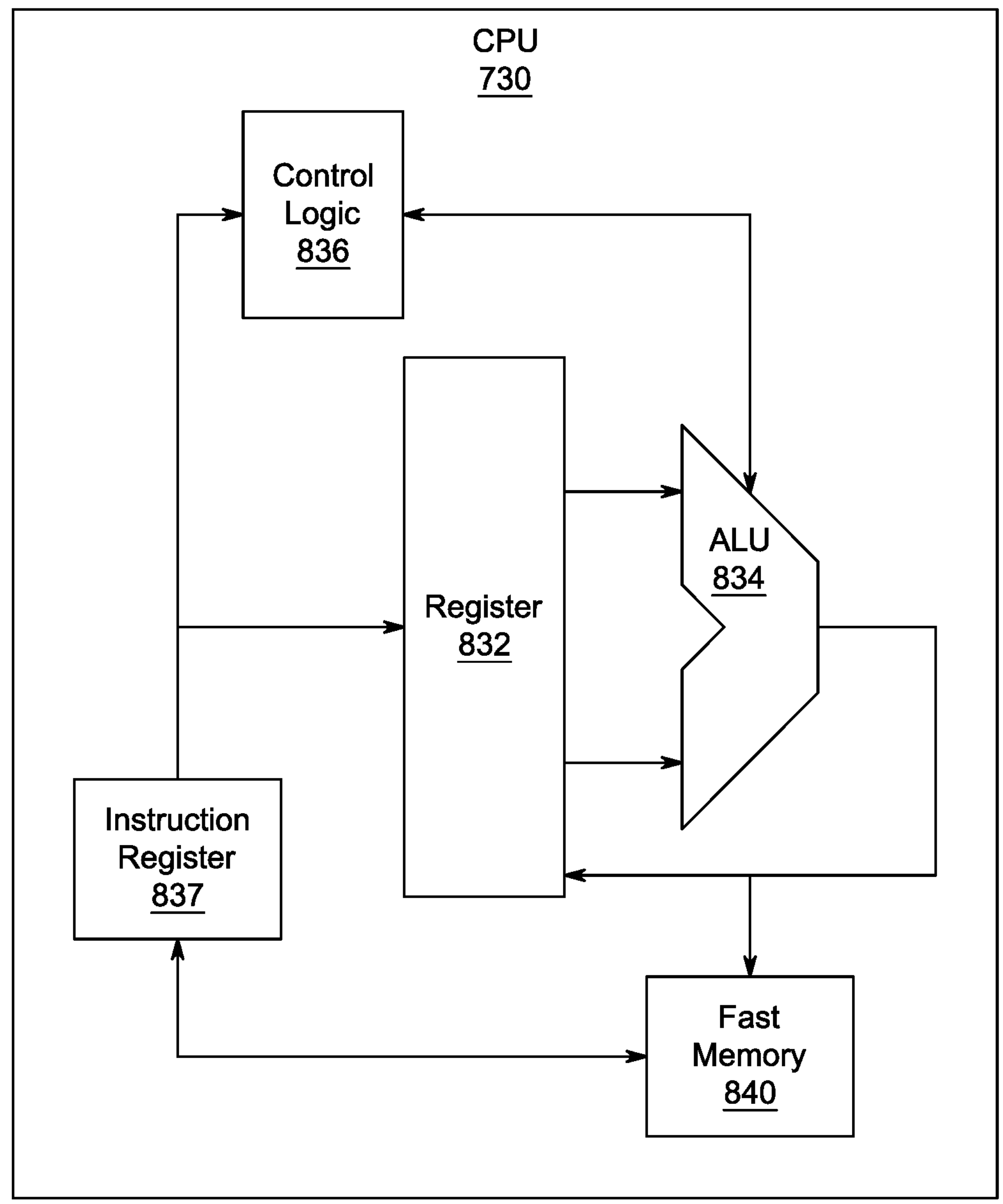
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions are fetched from the instruction register 838 by the control logic 836 and interpreted according to the instruction set architecture of the CPU 730. Part of the instructions can also be directed to the register 832. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 788 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 9:
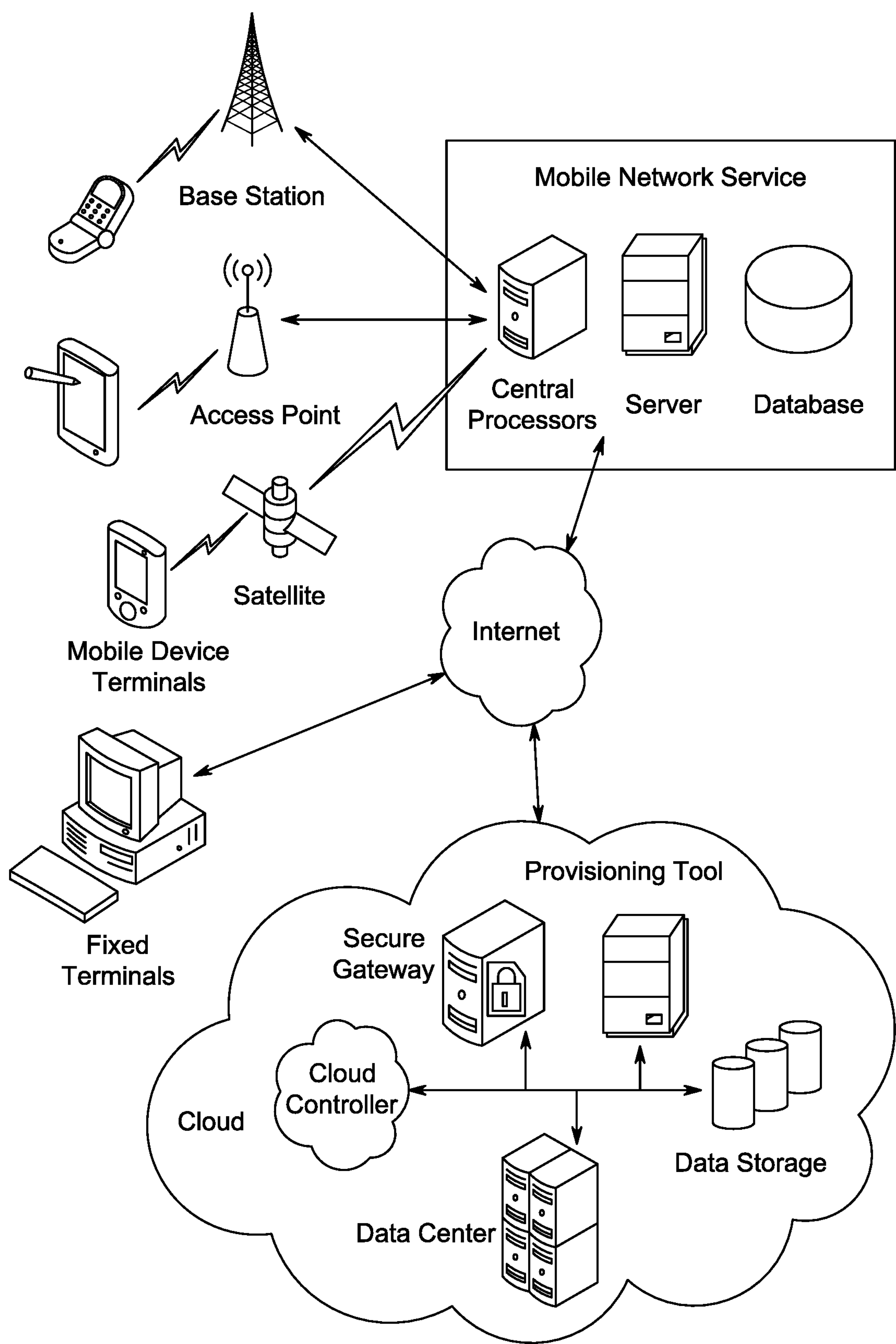
FIG. 9 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A vertical farming spraying system, comprising:

a robotic mobile sprayer, comprising:

a base having a rectangular body coupled with a pair of driving members, wherein each driving member of the pair of driving members comprises at least two wheels and a track mounted on the at least two wheels, wherein the at least two wheels are configured to drive the track around the at least two wheels;

a first cylindrical element and a second cylindrical element attached to a top portion of the base;

a pair of pumps at least partially disposed in the base, wherein a first pump of the pair of pumps is connected to the first cylindrical element and a second pump of the pair of pumps is connected to the second cylindrical element;

a first mechanical support mounted on a first flat plate, wherein the first flat plate is coupled proximal to a first end of the top portion of the base;

a humidity sensor and a humidifier sprayer mounted on the first mechanical support, wherein the humidifier sprayer is fluidly connected to the first pump through a first conduit;

a second mechanical support mounted on a second flat plate, wherein the second flat plate is coupled proximal to a second end of the top portion of the base;

a disinfection sensor and a disinfection sprayer mounted on the second mechanical support, wherein the disinfection sprayer is fluidly connected to the second pump through a second conduit;

wherein a first set of micro-jets is mounted on the humidifier sprayer, wherein a second set of micro-jets is mounted on the disinfection sprayer; and a control unit coupled to the base and in electrical communication with each driving member, the first mechanical support, and the second mechanical support, wherein the control unit is configured with instructions to drive the pair of driving members, wherein the control unit is in electrical communication with a flow control sensor connected to the first pump, the second pump, the humidity sensor, and the disinfection sensor; and a vertically oriented elongated cylindrical support surrounded by a spiral path, wherein the spiral path is configured to constrict locomotion of the robotic mobile sprayer from a start point on the spiral path at a base of the vertically oriented elongated cylindrical support up to an end point on the spiral path at a top of the vertically oriented elongated cylindrical support.

2. The vertical farming spraying system of claim 1, wherein the vertically oriented elongated cylindrical support comprises a plurality of projections extending from an outer surface of the vertically oriented elongated cylindrical support.

3. The vertical farming spraying system of claim 2, wherein the spiral path comprises an inner edge in contact with the projections of the vertically oriented elongated cylindrical support.

4. The vertical farming spraying system of claim 1, wherein a width of the spiral path is at least 1.2 times a width of the base of the robotic mobile sprayer.

5. The vertical farming spraying system of claim 1, wherein the flow control sensor is configured to receive a first set of inputs from the humidity sensor and control a pumping action of the first pump based on the first set of inputs.

6. The vertical farming spraying system of claim 5, wherein the pumping action of the first pump controls a moisture output of the humidifier sprayer based on the first set of inputs from the humidity sensor.

7. The vertical farming spraying system of claim 1, wherein the flow control sensor is configured to receive a second set of inputs from the disinfection sensor and control a pumping action of the second pump based on the second set of inputs.

8. The vertical farming spraying system of claim 7, wherein the pumping action of the second pump controls a disinfectant output of the disinfection sprayer based on the second set of inputs from the disinfection sensor.

9. The vertical farming spraying system of claim 1, wherein the humidifier sprayer and the disinfection sprayer are configured to move in a three-dimensional manner.

10. The vertical farming spraying system of claim 9, wherein the control unit is configured to control a rotation of each of the first mechanical support and the second mechanical support.

11. The vertical farming spraying system of claim 10, wherein the first mechanical support is configured to rotate about the first flat plate.

12. The vertical farming spraying system of claim 10, wherein the second mechanical support is configured to rotate about the second flat plate.

13. The vertical farming spraying system of claim 1, wherein each track is formed of an elastomeric material.

14. The vertical farming spraying system of claim 1, wherein each track has an outer surface configured to engage with a top surface of the spiral path.

15. The vertical farming spraying system of claim 1, wherein each track comprises an inner surface in contact with an outer surface of each of the at least two wheels.

16. The vertical farming spraying system of claim 1, wherein at least one wheel of the at least two wheels is a drive wheel.

17. The vertical farming spraying system of claim 1, wherein the control unit is configured to drive the track around the at least two wheels and move the base along the spiral path.

18. The vertical farming spraying system of claim 1, wherein the pair of pumps are peristaltic pumps.

19. The vertical farming spraying system of claim 1, wherein each of the first mechanical support and the second mechanical support comprises a set of bars and a set of joints.

20. The vertical farming spraying system of claim 16, wherein the set of joints are connection points between the set of bars.

* * * * *